(12) United States Patent
Suzuki

(10) Patent No.: US 7,342,367 B2
(45) Date of Patent: Mar. 11, 2008

(54) MOTOR DRIVE CIRCUIT, MOTOR SYSTEM, AND MOTOR DRIVE METHOD

(75) Inventor: Masahiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/628,819

(22) PCT Filed: Jun. 9, 2005

(86) PCT No.: PCT/JP2005/010557

§ 371 (c)(1),
(2), (4) Date: Dec. 7, 2006

(87) PCT Pub. No.: WO2005/122387

PCT Pub. Date: Dec. 22, 2005

(65) Prior Publication Data

US 2007/0236168 A1    Oct. 11, 2007

(30) Foreign Application Priority Data

Jun. 9, 2004    (JP) ............................. 2004-171071

(51) Int. Cl.
*H02P 5/40* (2006.01)
(52) U.S. Cl. ...................... 318/254; 318/138; 318/439
(58) Field of Classification Search ................ 318/254, 318/138, 439
See application file for complete search history.

(56) References Cited

U.S. PATENT DOCUMENTS

| | | | | |
|---|---|---|---|---|
| 5,382,886 | A | * | 1/1995 | Mizuide ...................... 318/807 |
| 5,430,362 | A | * | 7/1995 | Carr et al. ................... 318/779 |
| 5,703,449 | A | * | 12/1997 | Nagate et al. ............... 318/254 |
| 6,388,416 | B1 | * | 5/2002 | Nakatani et al. ............. 318/700 |
| 6,850,426 | B2 | * | 2/2005 | Kojori et al. ................ 363/123 |

FOREIGN PATENT DOCUMENTS

| | | |
|---|---|---|
| JP | 5 328783 | 12/1993 |
| JP | 8 7557 | 1/1996 |
| JP | 2001 61291 | 3/2001 |
| JP | 2001 184805 | 7/2001 |

* cited by examiner

*Primary Examiner*—Rita Leykin
(74) *Attorney, Agent, or Firm*—Frommer Lawrence & Haug LLP; William S. Frommer; Paul A. Levy

(57) ABSTRACT

A circuit suitable for formation as a small sized IC, able to decrease the number of externally attached parts and reduce the size, and stably rotating a motor. When rotating a rotor 101 by three-phase drive signals U, V, and W generated based on a CLK signal from a VCO 7, induction voltages induced in the three-phase coils 102 are monitored and a phase deviation of a rotor phase relative to an electric phase is detected. As a result, when the rotor phase is late relative to the electric phase, a charge pump circuit 5 is driven by an up signal f_up which becomes active for exactly a time in accordance with the phase delay amount, while when the rotor phase is advanced, the charge pump circuit 5 is driven by a down signal f_down which becomes active for exactly a time corresponding to a phase advance amount. In this motor drive circuit 1, the voltage of a VCO control terminal T_cp is directly and instantaneously and dynamically changed not in accordance with detected phase deviation information without going through a smoothing filter.

11 Claims, 10 Drawing Sheets

FIG. 2A CLK_vco

FIG. 2F PHASE OUTPUT DRIVE INFORMATION

FIG. 2G { Up, Vp, Wp, Un, Vn, Wn

FIG. 2H { U, DRIVE ELECTRIC ANGLE [deg], V, W }

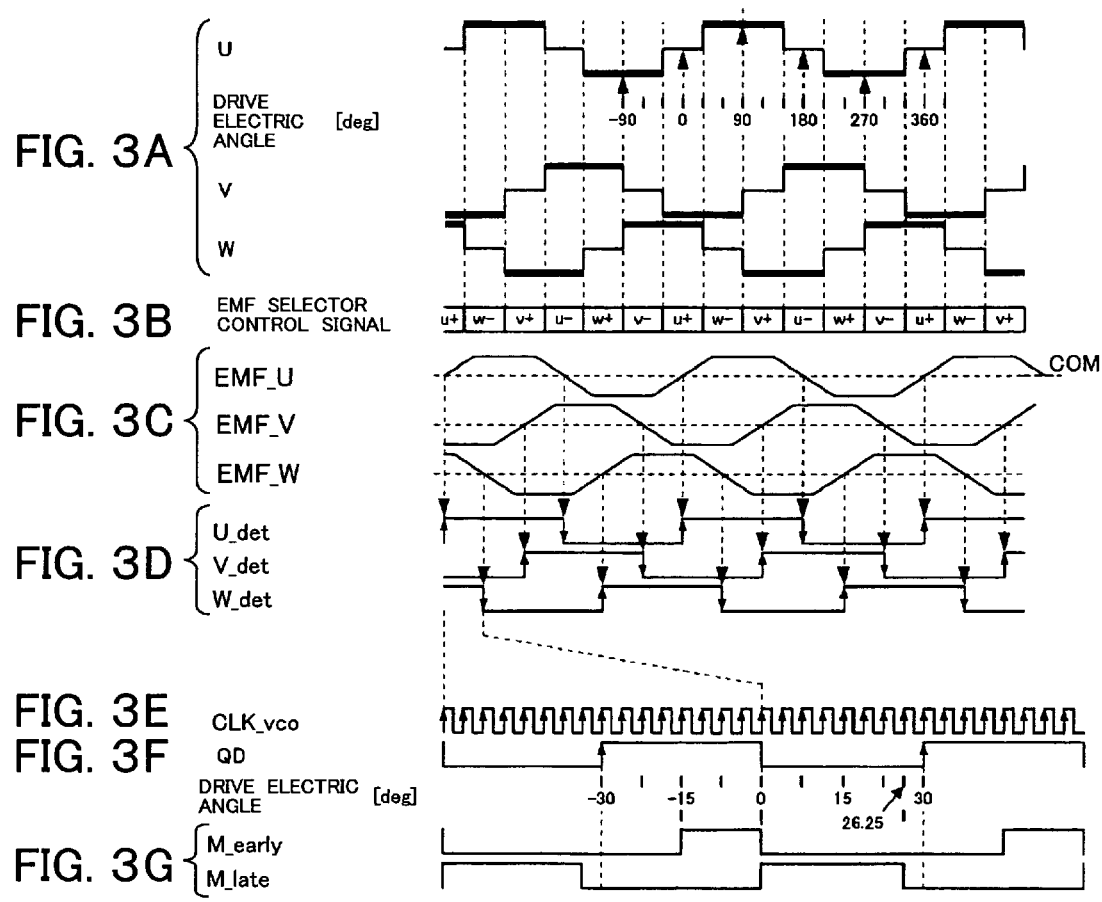

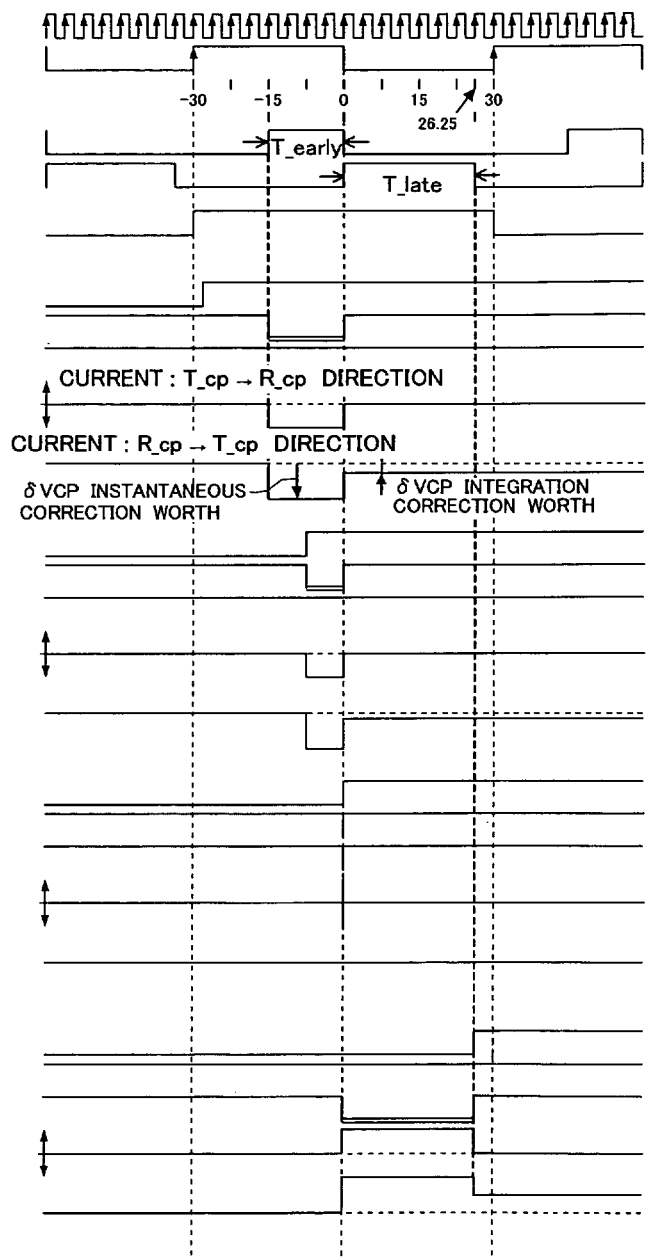

FIG. 7A1 CLK_vco
FIG. 7A2 QD
        DRIVE ELECTRIC ANGLE [deg]
FIG. 7A3 M_early
FIG. 7A4 M_late
FIG. 7A5 y5
<EXAMPLE 1>
FIG. 7B1 U_det
FIG. 7B2 f_up
FIG. 7B3 f_down
FIG. 7B4 CHARGE PUMP CURRENT
FIG. 7B5 T_cp
<EXAMPLE 2>
FIG. 7C1 U_det
FIG. 7C2 f_up
FIG. 7C3 f_down
FIG. 7C4 CHARGE PUMP CURRENT
FIG. 7C5 T_cp
<EXAMPLE 3>
FIG. 7D1 U_det
FIG. 7D2 f_up
FIG. 7D3 f_down
FIG. 7D4 CHARGE PUMP CURRENT
FIG. 7D5 T_cp
<EXAMPLE 4>
FIG. 7E1 U_det
FIG. 7E2 f_up
FIG. 7E3 f_down
FIG. 7E4 CHARGE PUMP CURRENT
FIG. 7E5 T_cp

MOTOR DRIVE CIRCUIT, MOTOR SYSTEM, AND MOTOR DRIVE METHOD

TECHNICAL FIELD

The present invention relates to a drive circuit of a so-called sensorless type brushless motor not having a position detection sensor for detecting a rotation angle of a rotor, a motor system including this, and a motor drive method.

BACKGROUND ART

As a drive circuit of sensorless motor, for example a circuit driving a three-phase brushless motor is known.

This circuit for driving a three-phase brushless motor does not use a Hall element or other circuit detection element, but utilizes an induction voltage (inverse electromotive force or EMF (electromotive force)) generated in the drive coils of the three phases and switches the drive current supplied to the drive coils of the three phases. The drive circuit of this type of general sensorless motor detects the induction voltage of the excitation coils of the three phases, gives a certain delay amount to a timing when a polarity is inverted, and switches application of the drive current supplied to the drive coils of the three phases (supply of power).

Further, the drive circuit of a general sensorless motor eliminates a spike voltage (flyback voltage) generated at the time of the switching of the supply of power by a filter etc. Further, the drive circuit of a general sensorless motor prepares for a case where the rotor of the motor is already at a location where it should stop (also referred to as the "reference position") and therefore the rotor of the motor is not started up immediately after the supply of power to the drive coils of the three phases by generating a startup pulse and forcibly switching to a power supply pattern of the drive coils of three phases when it is not possible to detect the induction voltage in the drive coils of the three phases within a certain time.

A delay amount is given to the power supply timing of such a drive current inverting in polarity. A filter for eliminating the spike voltage is provided. The signal processing systems for generating the startup pulse can be roughly classified into analog systems and digital systems.

A motor drive circuit of the analog system utilizes a CR time constant to eliminate the delay amount of the phase and the spike voltage and generate a startup pulse. A motor drive circuit of the digital system uses a microprocessor etc. to perform processing for functions equivalent to the analog system. Accordingly, a system having a large circuit scale can use the digital system, but applications where the circuit must be made small in scale cannot use a microprocessor etc. due to costs and the mounting area. Therefore, it has to use not the digital system, but the analog system.

The analog system has the defects that it is necessary to set the optimum constant of each element of the CR time constant circuit, but the setting the optimum constant is difficult since there are constant values which interfere with each other between elements. Further, large numbers of resistors and capacitors are necessary, therefore the number of parts becomes large.

In recent years, the vibration motors used as silent notifying means in electronic devices such as mobile phones for the purpose of use in noisy environments and of use by acoustically handicapped persons are being required to be made smaller in size, smaller in thickness, and higher in reliability. The motor generally used at the present is a brush-type coreless motor, but this motor has the problem of a short service life due to wear of the brush and the problem that the outside dimensions are hard to reduced in the diameter direction due to the structural requirement that air gaps must be provided inside and outside the rotating coil.

For this reason, elimination of the brush by fixing the coil of the vibration motor and using a permanent magnet as the rotor has been studied. A brushless motor does not have a brush, therefore has a high reliability and is advantageous for the reduction of thickness if making the motor structure a facing magnetic surface type. When viewing a brushless motor from the viewpoint of the design of the overall electronic device, there are requests for incorporating the drive circuit in the module of the motor. Note that naturally operational functions equivalent to the present brush-type coreless motors are required at this time.

In order to incorporate a drive circuit in a small-sized brushless motor, the formation of the drive circuit as an IC, the minimizing of the size of the IC leading to the reduction of the mounting area of the IC, a small number of externally attached electric parts other than the IC, and sufficiently small outer shapes of the externally attached electric parts are requested.

A drive circuit of a brushless motor using a phase locked loop (PLL) circuit is known (see for example Patent Document 1).

Patent Document 1 discloses a motor drive circuit and a motor drive method for the sensorless drive of a brushless DC motor by a simple circuit.

In Patent Document 1, a phase loop is formed so as to make the frequency output phase of the VCO determining the oscillation frequency match with the EMF phase. This becomes a so-called PLL circuit. The rotation phase of the rotor and the drive circuit phase are matched.

Patent Document 1: Japanese Patent Publication (A) No. 2001-061291

DISCLOSURE OF THE INVENTION

Problem to be Solved by the Invention

When using a PLL circuit such as in Patent Document 1, it is necessary to provide a loop filter (LPF: low pass filter) inside the PLL circuit for receiving an output signal of a phase comparator for comparing the rotation phase of the rotor and the drive circuit phase, smoothing this, and outputting the result as a frequency control signal to the VCO.

In general, the fluctuation in the rotation speed of a rotor depends on the mechanical time constant of its operation (several ms to several hundreds ms), therefore is gentler in comparison with the electric signal time constant. For this reason, it is necessary to also set the cutoff frequency of the loop filter at a low value, so there is a tendency that the electrostatic capacitance value of the capacitor configuring the LPF becomes a large value.

Patent Document 1 uses a so-called lead lag type filter shown in FIG. 4 of this Patent Document 1. The capacitance value of that capacitor is 1.291 µF to 11.621 µF (see Patent Document 1, page 7, left column, line 18).

The chip type multilayer ceramic capacitor of the currently smallest "0603" JIS standard size has a capacitance of 0.1 pF at the maximum and has a B characteristic of 6.3V, therefore when trying to obtain the above electrostatic capacitance value, the device ends up becoming larger in chip size.

The method of lowering an operating current of the loop filter so that a capacitor having a smaller electrostatic capacitance value can be used without changing the bandwidth of the loop filter may be considered, but this leads to a higher operation impedance before or after that, so deterioration of the current precision of the circuit system and a drop in the external noise tolerance are a concern.

Due to the above, development of a new drive technique for stably driving a motor without smoothing the output signal of the phase comparator is demanded.

An object of the present invention is to provide a sensorless motor drive circuit more suitable for formation as an IC in comparison with a conventional circuit, able to minimize the size of the IC circuit, decreasing the number of externally attached electric parts other than the IC, making the constants of the externally attached electric parts values giving the smallest chip size, and obtaining further stable rotation operation of the motor.

MEANS FOR SOLVING/THE INVENTION

The motor drive circuit according to the present invention is a motor drive circuit for driving a sensorless brushless DC motor provided with a rotor and a plurality of coils facing the rotor, comprising a drive signal generator having a built-in voltage controlled type variable frequency oscillation circuit oscillating at a frequency in accordance with the voltage applied to a control terminal and generating a clock signal and generating a plurality of drive signals having a cycle defined by the frequency of the clock signal and having sequentially different phase differences based on the clock signal from the variable frequency oscillation circuit; a phase deviation detector for detecting induction voltages induced in the plurality of coils when supplying a plurality of drive signals to said plurality of coils to rotate the rotor and detecting the phase deviation of the rotor phase obtained from the induction voltages relative to the electric phase obtained from said drive signals; and an oscillation controller receiving as input phase deviation information output from said phase deviation detector, changing the voltage of said control terminal for exactly a time in accordance with a phase delay amount when the phase deviation information indicates delay of the rotor phase relative to the electric phase, and changing the voltage of said control terminal in a direction reverse to the case of said phase delay for exactly a time corresponding to a phase advance amount when the phase deviation information indicates advance of the rotor phase.

In the present invention, preferably the circuit further comprises a control limiter for setting an upper limit of each control time so that a maximum control time when the oscillation controller controls the voltage of the control terminal to raise the oscillation frequency of the variable frequency oscillation circuit becomes shorter than a maximum control time when it controls the voltage to lower the oscillation frequency.

Preferably, the oscillation controller includes a charge/discharge circuit charging the control terminal when the rotor phase is delayed relative to the electric phase and discharging the control terminal when the rotor phase is advanced in accordance with the phase deviation information and a conversion element connected to the control terminal and converting a current change at the time of a charge or the time of a discharge of the control terminal by the charge/discharge circuit to a voltage change of the control terminal, and the control limiter limits the charging/discharging time of the charge/discharge circuit so that one maximum charging time of the charge/discharge circuit becomes shorter than one maximum discharging time.

Alternatively, preferably the phase deviation detector has a selector outputting a first signal when the information of the phase deviation indicates that the rotor phase is delayed in relative to the electric phase and outputting a second signal when the information of the phase deviation indicates that the rotor phase is advanced relative to the electric phase, the control limiter sets a maximum duration of an active state of the first signal shorter than the maximum duration of the active state of the second signal, and the oscillation controller changes the voltage of the control terminal for exactly the duration of the active state of the first or second signal input from the selector.

In the present invention, preferably the drive signal generator has a startup control circuit setting a startup frequency for reliably starting up the rotor from the stopped state as a lower limit frequency.

A motor system according to the present invention is a motor system having a built-in sensorless brushless DC motor provided with a rotor and a plurality of coils facing the rotor and a motor drive circuit for driving the brushless DC motor in a module form, wherein said motor drive circuit has a drive signal generator having a built-in voltage controlled type variable frequency oscillation circuit oscillating at a frequency in accordance with the voltage applied to a control terminal and generating a clock signal and generating a plurality of drive signals having a cycle defined by the frequency of the clock signal and having sequentially different phase differences based on the clock signal from the variable frequency oscillation circuit; a phase deviation detector for detecting induction voltages induced in the plurality of coils when supplying a plurality of drive signals to said plurality of coils to rotate the rotor and detecting the phase deviation of the rotor phase obtained from the induction voltages relative to the electric phase obtained from said drive signals; and an oscillation controller receiving as input phase deviation information output from said phase deviation detector, changing the voltage of said control terminal for exactly a time in accordance with a phase delay amount when the phase deviation information indicates delay of the rotor phase relative to the electric phase, and changing the voltage of said control terminal in a direction reverse to the case of said phase delay for exactly a time corresponding to a phase advance amount when the phase deviation information indicates advance of the rotor phase.

A motor drive method according to the present invention is a motor drive method for driving a sensorless brushless DC motor provided with a rotor and a plurality of coils facing the rotor, comprising the steps of operating an oscillator by a frequency in accordance with a voltage applied to a control terminal to generate a clock signal of a frequency in accordance with the oscillation frequency of the oscillator, generating a plurality of drive signals which have a cycle defined by the frequency of the clock signal and have sequentially different phase differences based on the clock signal, detecting induction voltages induced in the plurality of coils when rotating the rotor by supplying a plurality of drive signals to said plurality of coils, detecting the phase deviation of the rotor phase obtained from the induction voltages relative to the electric phase obtained from said drive signals, and inputting said phase deviation information, changing the voltage of said control terminal for exactly a time in accordance with the phase delay amount when the phase deviation information indicates a delay of the rotor phase relative to the electric phase, and changing the voltage of said control terminal to a direction reverse to the case of said phase delay for exactly a time corresponding to the phase advance amount when the phase deviation information indicates an advance of the rotor phase to thereby control the oscillation frequency at the time of generation of said clock signal corresponding to the time change of said phase deviation information.

In the present invention, preferably the method further comprises setting an upper limit of each control time so that a maximum control time when raising the voltage of the control terminal to raise the oscillation frequency of the variable frequency oscillation circuit becomes shorter than a maximum control time when controlling the voltage to lower the oscillation frequency.

Preferably, the method further comprises charging the control terminal when the rotor phase is delayed relative to the electric phase and discharging it when the rotor phase is advanced in accordance with the phase deviation information and, at the time of charging and discharging, limiting the charging/discharging time so that one maximum charging time becomes shorter than one maximum discharging time and converting the current change at the time of the charging or the time of discharging of the control terminal to a voltage change of the control terminal.

Alternatively, preferably, the method further comprises outputting a first signal when the information of the phase deviation indicates that the rotor phase is delayed relative to the electric phase, outputting a second signal when the information of the phase deviation indicates that the rotor phase is advanced relative to the electric phase, making a maximum duration of the active state of the first signal shorter than a maximum duration of the active state of the second signal, and changing the voltage of the control terminal for exactly the duration of the active state of the first or second signal.

In the present invention, preferably the method further comprises, at the time of the generation of the clock signal, controlling the lower limit frequency to make the startup frequency for reliably starting up the rotor from the stopped state the lower limit.

Effect of the Invention

According to the present invention, it is possible to obtain a circuit more suitable for formation as an IC in comparison with a conventional circuit, able to minimize the size of the IC circuit, decreasing the number of externally attached electric parts other than the IC, making the constants of the externally attached electric parts values giving the smallest chip size, and obtaining further stable rotation operation of the motor.

BRIEF DESCRIPTION OF THE DRAWINGS

[FIG. 2] A timing chart showing signal waveforms and their timings mainly in a drive system circuit of the motor drive circuit.

[FIG. 3] A timing chart showing signal waveforms and their timings mainly in a control system circuit of the motor drive circuit.

[FIG. 7] A timing chart showing four examples showing examples of the voltage change of a VCO control terminal (CP terminal) in accordance with pulse widths of an up signal and a down signal.

DESCRIPTION OF NOTATIONS

1 . . . motor drive circuit, 2 . . . motor drive IC, 3 . . . rotor phase detector, 4 . . . logic unit, 41 . . . drive pulse generator, 42 . . . pulse width phase comparator, 43 . . . control signal generator, 44 . . . selector, 5 . . . charge pump circuit, 6 . . . charge pump current setter, 7 . . . voltage controlled oscillator (VCO), 71 . . . VCO capacity, 8 . . . preamplifier, 9 . . . output unit, 100 . . . motor, 101 . . . rotor, 102 . . . coil, 102U . . . U-phase coil, 102V . . . V-phase coil, 102W . . . W-phase coil, C_cp . . . charge pump capacitor, C_DC . . . decoupling capacitor, CLK_vco . . . clock signal, R_Iref . . . charge pump current setting resistor, R_cp . . . charge pump resistor, U, V, W . . . drive signals Best Mode for Working the Invention Below, an embodiment of the present invention will be explained with reference to the drawings.

Figure 1:
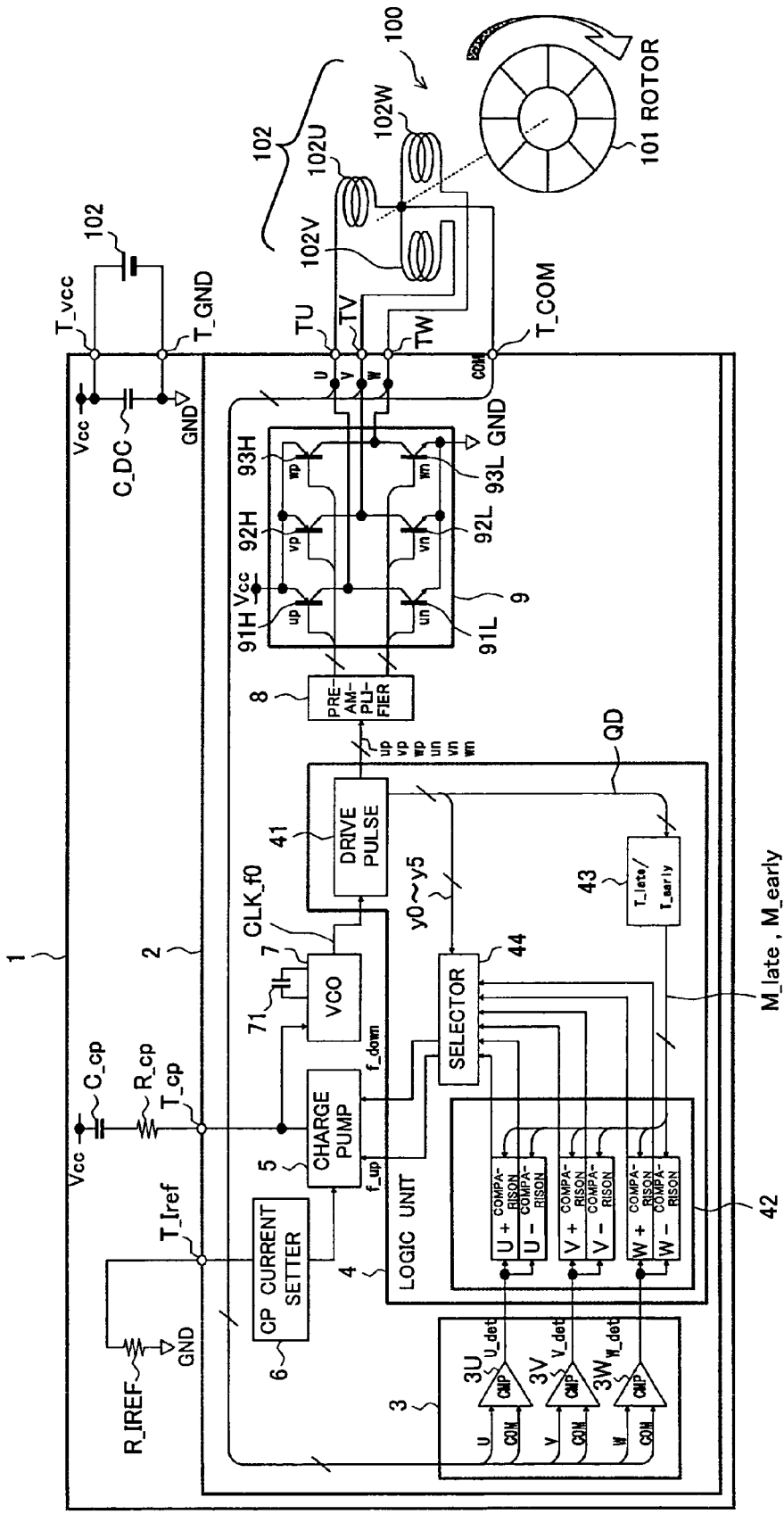
[FIG. 1] A view of the configuration showing a sensorless three-phase brushless DC motor according to an embodiment of the present invention and a motor drive circuit thereof.

FIG. 1 shows a sensorless three-phase brushless DC motor according to an embodiment of the present invention and a motor drive circuit thereof.

A motor drive circuit 1 exemplified in FIG. 1 drives a sensorless three-phase brushless DC motor (hereinafter simply referred to as a "motor") 100. The motor 100 has a built-in rotor 101 provided with a magnet and stator provided with motor drive coils 102U, 102V, and 102W (hereinafter simply referred to as "coils 102") of for example three phases (U-phase, V-phase, and W-phase).

The shaft of the rotor 101 is provided around it with for example eight magnets.

The coils 102 are comprised of three coils arranged facing the rotor 101 with an electrical phase difference of 120°, i.e., a U-phase coil 102U, a V-phase coil 102V, and a W-phase coil 102W.

These three coils are connected in a star configuration. A connection middle point thereof is connected to for a middle point potential COM terminal T_COM of the motor drive circuit 1. The other ends of the U-phase coil 102U, V-phase coil 102V, and the W-phase coil 102W are connected to drive signal supply terminals TU, TV, and TW of the motor drive circuit 1.

The motor drive circuit 1 shown in FIG. 1 integrates almost all of the processing circuits in a motor drive IC 2 having for example a bi-CMOS (bipolar-CMOS) configuration and reduces the number of externally attached electric parts as much as possible.

As the externally attached electric parts, there are a charge pump current setting resistor R_Iref, a charge pump capacitor C_cp, a charge pump resistor R_cp, and a decoupling capacitor C_DC. These externally attached electric parts and motor drive IC 2 and the motor 100 are mounted on one printed circuit board to form a module.

The decoupling capacitor C_DC is connected between a supply terminal T_vcc of the power supply voltage Vcc of the motor drive circuit 1 and a supply terminal T_GND of a ground voltage GND. The decoupling capacitor C_DC can stabilize the impedance between the supply line of the power supply voltage Vcc and the supply line of the ground voltage GND.

The power supply voltage Vcc supplied from the terminal T_vcc and the ground voltage GND supplied from the terminal T_GND are supplied to the motor drive IC 2. The motor drive IC 2 and the motor 100 are operated by the electric power by this.

Further, the internal supply line of the power supply voltage Vcc and the control terminal T_cp of the motor drive IC 2 have the charge pump capacitor C_cp and the charge pump resistor R_cp connected in series between them. Further, the charge pump current setting resistor R_Iref is connected between the supply terminal T_Iref of the reference current I_ref of the motor drive IC 2 and the internal supply line of the ground voltage GND. The roles of these capacitor and resistors will be explained later.

In the example of the configuration shown in FIG. 1, the charge pump current setting resistor R_Iref and the charge pump resistor R_cp are disposed outside of the motor drive IC 2, but by limiting the magnetic characteristics and mechanical time constant of the sensorless three-phase brushless motor 100 being driven, these two resistors R_Iref and R_cp can be built in the motor drive IC 2. In that case, it is possible to further reduce the number of externally attached parts.

The motor drive IC 2 drives the motor 100, detects the phase of the rotor 101 at that time (U-phase, V-phase, or W-phase), compares that phase (hereinafter referred to as the rotor phase or EMF phase) and the drive phase (also referred to as the electric phase) for driving the rotor, adjusts the phases of the drive signals of the coils in accordance with the comparison results, and controls the rotation speed of the rotor 101 to a desired value by supplying the adjusted drive signals to the coils 102.

In order to achieve this object, the motor drive IC 2, as shown in FIG. 1, has a rotor phase detector 3, logic unit 4, charge pump circuit 5, charge pump current setter 6, voltage controlled oscillator (VCO) 7, preamplifier 8, and output unit 9.

The logic unit 4 further has a drive pulse generator 41, a limit signal generator 43 for limiting the pulse width of the control signals according to maximum control times T_late and T_early, and a selector 44.

The parts forming the motor drive IC 2 may be roughly classified into a drive system circuit for generating drive signals U, V, and W of the three phases for driving the coils 102 based on a clock signal CLK_vco from the VCO 7 and a control system circuit for controlling a motor rotation speed by changing frequencies of the drive signals U, V, and W.

In FIG. 1, the VCO 7, drive pulse generator 41, preamplifier 8, and output unit 9 constitute the drive system circuit which constitutes an embodiment of the "drive signal generator" of the present invention. The other portions constitute the control system circuit. Details thereof will be explained later.

First, the configurations and operations of the parts of the drive system circuit will be explained. Below, in the explanation of the operations, the signal waveforms of FIG. 2A to FIG. 2H and FIG. 3A to FIG. 3G and the timing charts showing timings thereof will be appropriately referred to.

The VCO 7 is a voltage controlled type oscillation circuit which operates by a frequency in accordance with the potential of the control input and generates the clock signal CLK_vco having a constant cycle in accordance with the oscillation frequency. The control input of the VCO 7 is connected to the control terminal T_cp of the motor drive IC 2. Further, the clock output of the VCO 7 is connected to the input of the drive pulse generator 41 connected to the next stage.

The VCO of the present example uses the power supply voltage Vcc as a reference and performs an operation for raising the frequency of the clock signal CLK_vco to be output the lower the potential of the control terminal T_cp compared with the power supply voltage Vcc.

The characteristic feature of the VCO 7 of the present example resides in that even when the control terminal T_cp potential is the reference power supply voltage Vcc, the VCO 7 does not suspend the oscillation and continues the oscillation by a low frequency. This lower limit frequency is the oscillation frequency which becomes the rotation speed for reliably starting up the motor from the stopped state and is defined by the not shown startup control circuit in the VCO 7.

In more detail, the startup control circuit defines the time constant for reliably performing the oscillation operation with a low frequency according to the following equation (1) using an oscillation cycle T0 inherent in the drive system having a startup cycle t0, a number P of magnet poles P, and the smallest common multiple g of the number of coils or slots and the number of magnet poles.

$$t_0 \geq \{(P/\pi g)+(\pi-2)/4\pi\}T_0 \quad \text{[Equation 1]}$$

In order to set the timing constant defined in this way in the VCO 7, an oscillation startup capacitor 71 is connected to the VCO 7.

The drive pulse generator 41 is a logic circuit belonging to the circuit block of the logic unit 4 and generating a group of drive pulses (Up, Vp, Wp, Un, Vn, Wn) for driving the output unit 9. Further, the output unit 9 driven by the group of drive pulses (Up, Vp, Wp, Un, Vn, Wn) outputs drive signals U, V, and W of three phases and supplies these to the coils 102 of the three phases.

The illustration of the concrete circuit of the drive pulse generator 41 is omitted. The circuit of the output unit 9 is shown in FIG. 1.

The output unit 9 has six bipolar transistors 91H, 91L, 92H, 92L, 93H, and 93L for the output of the three-phase drive signals U, V, and W. These break down into the three PNP transistors 91H, 92H, and 93H as Hi-side switch and the three NPN transistors 91L, 92L, and 93L as the Low-side switch. The transistor 91H to whose base the drive pulse Up is supplied and the transistor 91L to whose base the drive pulse Un is supplied are connected in series between the power supply voltage Vcc and the ground voltage GND. The drive signal U having the U-phase is output from the connection middle point thereof. In the same way, the transistor 92H to which the drive pulse Vp is supplied and the transistor 91L to which the drive pulse Vn is supplied are connected in series. The drive signal V having the V-phase is output from the connection middle point thereof. The transistor 93H to which the drive pulse Wp is supplied and the transistor 93L to which the drive pulse Wn is supplied are connected in series. The drive signal W having the W-phase is output from the connection middle point thereof.

The pre-amplifier 8 receives the output from the drive pulse generator 41 and supplies the base current required for turning on or off the six transistors 91H, 91L, 92H, 92L, 93H, and 93L of the output unit 9.

FIG. 2H shows the finally generated drive signals U, V, and W of the three phases. FIG. 2H shows a drive electric angle with respect to the drive signal U. The drive electric angle is one by which an intermediate point of a rising period of the drive signal U is made 0°. One cycle is defined as 360°.

The drive signals U, V, and W of the three phases driving the DC motor 100 are basically binary pulse waveforms having a high level and a low level. A wait period of ±30° is provided at the time of the level transition in the present example. Further, the drive signals U, V, and W of the three phases have a phase difference of about 120°. For this reason, the three-phase coils are always given a high level signal, given a low level signal, and placed in a wait state at any timing.

Waveforms of the group of drive pulses (Up, Vp, Wp, Un, Vn, Wn) for generating the drive signals U, V, and W of the three phases are shown in FIG. 2G.

The drive pulses Up, Vp, Wp, Un, Vn, and Wn have waveforms with a pulse width of 120° in terms of the electric angle, a cycle of 360°, and a duty ratio of 1/3.

The three drive pulses Up, Vp, and Wp for driving the Hi-side of the output unit 9 among these have phase differences of 120° relative to each other. Further, the drive pulse pairs of the phases, that is, Up and Un, Vp and Vn, and Wp and Wn, have phase differences of 60° relative to each other.

Such drive pulse widths, cycles, and phase differences are determined according to the specifications of the motor 100, that is, the number of drive phases and the number of magnets attached to the rotor, and the configuration of the output unit 9. In the present example, the rotor 101 having eight magnets attached to it is driven by three phases by the output unit 9 having the configuration shown in FIG. 1, therefore the drive pulses Up, Vp, Wp, Un, Vn, and Wn required for the generation of the drive signals are generated by the drive pulse generator 41 so that the drive signals U, V, and W from the output unit 9 exhibit waveforms shown in FIG. 2H having phase differences of about 120°.

The concrete circuit configuration of the drive pulse generator 41 is omitted, but in the present example, FIG. 2A to FIG. 2E show waveforms generated in the middle of the drive pulse generation. These are used in place of that. As apparent from these waveforms, the drive pulse generator 41 can be configured by a logic circuit based on a general frequency-division circuit.

The drive pulse generator 41 first receives as input the clock signal CLK_vco (FIG. 2A) having the oscillation frequency F_vco from the VCO 7 and divides the frequency into two four times.

The signals generated in this frequency division step are shown in FIG. 2B. In the figure, a signal QA is the signal after the first frequency division, a signal QB is the signal after a second frequency division, a signal QC is the signal after a third frequency division, and a signal QD is the signal after a fourth frequency division. The fourth frequency divided signal QD becomes a clock signal having a cycle 16 times the clock signal CLK_vco.

The drive pulse generator 41 has for example six built-in counters. The six counters sequentially start the count operation of the number of pulses of the clock signal CLK_vco at the rising edge of the pulse of the fourth frequency divided signal QD. The counter of each stage makes the output (for example carry up) the high level during the count operation and changes the output to the low level at the same time of the end of the count operation. Further, the counter of each stage suspends the count operation by the increment of the number of pulses of the input clock signal CLK_vco by 16.

For this reason, the six stages of counters output, as shown in FIG. 2C and FIG. 2E, pulse signals y0, y1, y2, y3, y4, and y5 having a pulse width of 16 cycles' worth of the clock signal CLK_vco and having a cycle of 96 cycles' worth of the clock signal CLK_vco. This generation of six pulse signals y0 to y5 having the cycle 96 times the reference pulse (pulse of the clock signal CLK_vco) by the frequency division circuit and counters is referred to as a "1/96 count operation" here for convenience.

Thereafter, the drive pulse generator 41 decodes these pulse signals y0 to y5 to generate the drive pulses Up to Wn shown in FIG. 2G.

The drive pulse generator 41 generates the drive pulses Up to Wn, but has, as another role, the role of giving drive electric angle information (EMF selector control signal: FIG. 3B) to the limit signal generator 43 and further giving phase output drive information (FIG. 2F) to the preamplifier 8 controlling the output unit 9.

First, the phase output drive information will be explained.

The phase output drive information, as shown in FIG. 2F, takes either the value of "y0", "y1", "y2", "y3", "y4", or "y5". This phase output drive information becomes a signal for the control of the drive output phase and the selection of the phase and polarity of EMF. That is, the six types of input signals Up, Vp, Wp, Un, Vn, and Wn of the preamplifier 8 are determined in accordance with the phase output drive information (FIG. 2F). Due to this, the drive signal U of the U-phase, the drive signal V of the V-phase, and the drive signal W of the W-phase are generated at the output unit 9.

For the selection of the phase and polarity of the EMF, the phase output drive information (FIG. 2F) of the phase difference signal from the phase comparator 42 is selected at the selector 7. The selected phase is shown as the EMF selector control signal in FIG. 3(B). Here, "U+" shows that the EMF comparator output on the U-phase rising side (+side) is selected. Further, "V−" shows that the EMF comparator output on the V-phase falling side (−side) is selected.

FIG. 3C illustrates the EMF signals having phases of U, V, and W as EMF waveforms EMF_U, EMF_V, and EMF_W when the motor 100 is operating normally. In this FIG. 3C, a lateral broken line is the middle point potential COM potential.

Due to this, the output signal (U_det signal) of the comparator 3U takes the high level when the EMF signal EMF_U of the U-phase is higher than the middle point voltage COM of the drive coil and takes the low level when the former is lower than the latter. This is true for other two phases as well.

The above EMF selector control signal (FIG. 3B) is information indicating whether the rising edge is detected or the falling edge is detected for each phase.

Next, the configuration and operation of the control system circuit will be explained.

The control system circuit is configured by the circuits in the logic unit 4 other than the drive pulse generator 41, the rotor phase detector 3, the charge pump circuit 5, the charge pump current setter 6, and externally attached parts connected to the terminals T_cp and T_Iref.

Among these, the charge pump circuit 5, the charge pump current setter 6, and externally attached parts connected to terminals T_cp and T_Iref comprise an embodiment of the "oscillation controller" of the present invention.

As circuits in the logic unit 4 configuring the control system circuit, provision is made of a limit signal generator 43 for generating limit signals M_late and M_early described as "T_late/T_early" in FIG. 1 for limiting one maximum control time of the oscillation controller by defining the maximum pulse width of the signal output to the oscillation controller, the selector 44, and the phase comparator 42. The selector 44 and phase comparator 42 and the rotor phase detector 3 comprise an embodiment of the "phase deviation detector" of the present invention.

Note that it is not always necessary to configure the limit signal generator 43, selector 44, and phase comparator 42 divided as physical circuit blocks and may be provided as functions of the logic unit 4.

In the present embodiment, the control system circuit for controlling the oscillation of the VCO roughly has the following three functions.

A first function is the function of detecting a polarity change point of each rotor phase by the rotor phase detector 3, comparing the polarity change point of each rotor phase and the polarity change point of the drive phase obtained from the drive pulse generator 41, and detecting the phase deviation relative to the drive phase of the rotor phase.

A second function is the function of generating an up signal f_up for raising an oscillation frequency F_vco of VCO 7 and a down signal f_down for lowering the oscillation frequency F_vco and outputting either of them based on the results of the phase deviation detection.

A third function is the function of the limit signal generator 43 for limiting the operation of the oscillation controller, and in the present example, the function of limiting the phase width indicating the active period of the up signal f_up within a phase range of from the predetermined advance electric angle to the electric angle zero (the maximum duration T_early of the pulse indicating the active state), and the function of limit the pulse width indicating the active state of the down signal f_down within a phase range from the electric angle zero to the predetermined delay electric angle (the maximum duration T_late of the pulse width indicating the active state). One of the major characteristic features of the present embodiment resides in that, in the third function, the maximum duration T_late for the down signal f_down is made longer than the maximum duration T_early for the up signal f_up, that is, (T_late>T_early).

Below, the configurations and operations of the parts for realizing these functions will be explained.

The rotor phase detector 3 has three comparators (CMP) 3U, 3V, and 3W. Each comparator detects that the polarity of the phase (rotor phase) of the induction voltage (EMF) induced in the corresponding coil 102 is inverted by for example the rotation of the rotor 101 in the motor 100.

In order to impart the standard of the polarity of the rotor phase, first inputs of the comparators 3U, 3V, and 3W are connected to the terminal T_COM for inputting the middle point potential COM of the star configuration coils 102.

In order to monitor the EMF changing according to time, the other input of the comparator 3U is connected to a terminal TU for supplying the EMF signal of the U-phase coil 102U (hereinafter, described as "EMF_U"). In the same way, the other input of the comparator 3V is connected to a terminal TV for supplying the EMF signal of the V-phase coil 102V (hereinafter, described as "EMF_V"), and further the other input of the comparator 3W is connected to a terminal TW for supplying the EMF signal of the W-phase coil 102W (hereinafter described as "EMF_W").

The comparators 3U to 3W output the comparator output signals U_det, V_det, and W_det taking the high level when the polarity of EMF is "+" and taking the low level when the polarity of EMF is "−".

The phase comparator 42 compares the drive phase and the rotor phase (EMF phase). As the concrete comparison method, for example the following method can be employed although this cannot be said to be true across the board since it depends upon the drive phase information obtained from the drive pulse generator 41.

Here, the phase comparator 42 has, for the U-phase, a function of "U+comparison" regarding the time center of the period during which the U-phase drive signal U rises as the point of change of the polarity of the U-phase from negative to positive and comparing the phase of the polarity change point of the drive (electric) phase with the polarity change point of the rotor phase indicated by the output signal U_det of the comparator 3U from negative to positive and a function of "U-comparison" regarding the time center of the period during which the U-phase drive signal U falls as the point of change of the polarity of the U-phase from positive to negative and comparing the phase of the polarity change point of the drive (electric) phase with the polarity change point of the rotor phase indicated by the output signal U_det of the comparator 3U from positive to negative.

The phase comparator 42 has the functions of "V+ comparison" and "V−comparison" and "W+comparison" and "W−comparison" in the same way also for the V-phase and W-phase. These functions are shown in the phase comparator 42 shown in FIG. 1.

The selector 44 receives for example the phase output drive information (FIG. 2F) given from the six pulse signals y0 to y5 from the drive pulse generator 41, selects the comparison result having a suitable phase and polarity from among the comparison results of the rotor phases and the drive phase for each rising side ("+" side) and falling side ("−" side) of the phases of the drive signals U, V, and W output from the phase comparator 42, and outputs the same. These outputs are output as the up signal f_up and down signal f_down to the charge pump circuit 5.

The limit signal generator 43 need only be able to limit the pulse widths of the above up signal f_up and down signal f_down in the active state as a result. When that object can be achieved, the limit signal generator 43 can directly control anything. That is, it may limit the signal selection time from the selector 44, may limit the signal input to the phase comparator 42 in the front stage thereof, or may directly limit the output signals of the selector 44 (f_up signal and f_down signal).

The limit signal generator 43 and the circuit parts limited by the limit signal from the limit signal generator 43 configure the "limit controller" of the present invention.

As a preferred method for imparting the control limit, the limit signal generator 43 generates for example the limit signal M_late having the width of T_late and the limit signal M_early having the width of T_early and obtains an AND logic between these limit signals and the signal to be limited. If utilizing the AND gate built-in the phase comparator 42 etc. at this time, it is not necessary to specially provide the AND gate. This is desirable from the viewpoint of keeping down the circuit scale.

Figure 4:
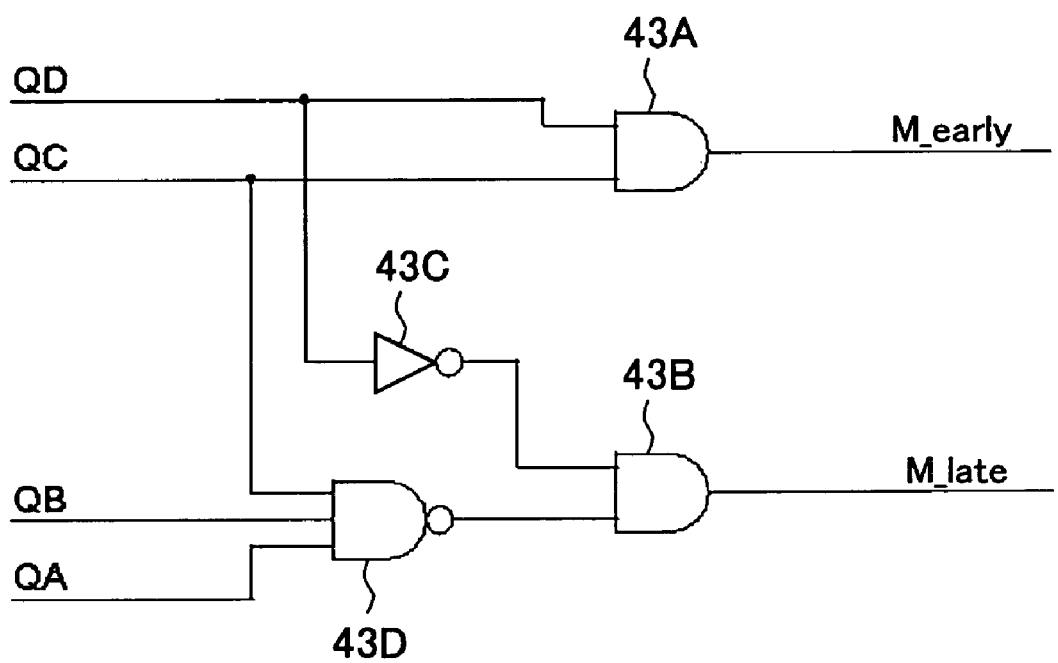
[FIG. 4] A circuit diagram showing an example of the configuration of a limit controller for generating a limit signal.

FIG. 4 shows an example of the circuit of the limit controller 43 for generating the limit signal M_late having the width of T_late and the limit signal M_late having the width of T_early.

In FIG. 4, the limit controller 43 is configured by two two-input AND gates 43A and 43B, an inverter 43C, and a three-input NAND gate 43D.

In order to make the maximum pulse width T_early of the phase advance side the electric angle 30° or so, signals QC and QD are given to the input of the AND gate 43A in order to obtain the AND logic between the third frequency divided signal QC and the fourth frequency divided signal QD shown in FIG. 2B. The limit signal M_early is output from the output thereof. The cycle of the limit signal M_early becomes the electric angle 60° or so.

The fourth frequency divided signal QD is inverted by the inverter 43C and given to one input of the two-input AND gate 43B, and the third frequency divided signal QC is given to the first input of the NAND gate 43D. At this time, the second frequency divided signal QB is given to the second input of the NAND gate 43D, the first frequency divided signal QA is given to the third input, and the output of the NAND gate 43D is given to the other input of the AND gate 43B. This AND gate 43B outputs the short limit signal M_late having a cycle of the electric angle 60° or so and having a pulse width of about 7.5° or so the same as the first frequency divided signal QA.

Note that this circuit configuration is an example and can be changed in any way in accordance with the limit maximum time (pulse width of limit signal) to be obtained.

Figure 5A:
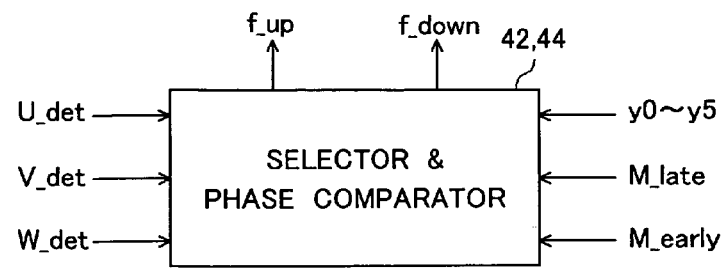
[FIG. 5] A block diagram and a circuit diagram showing an example of the configuration having functions of a selector and a phase comparator.
Figure 5B:
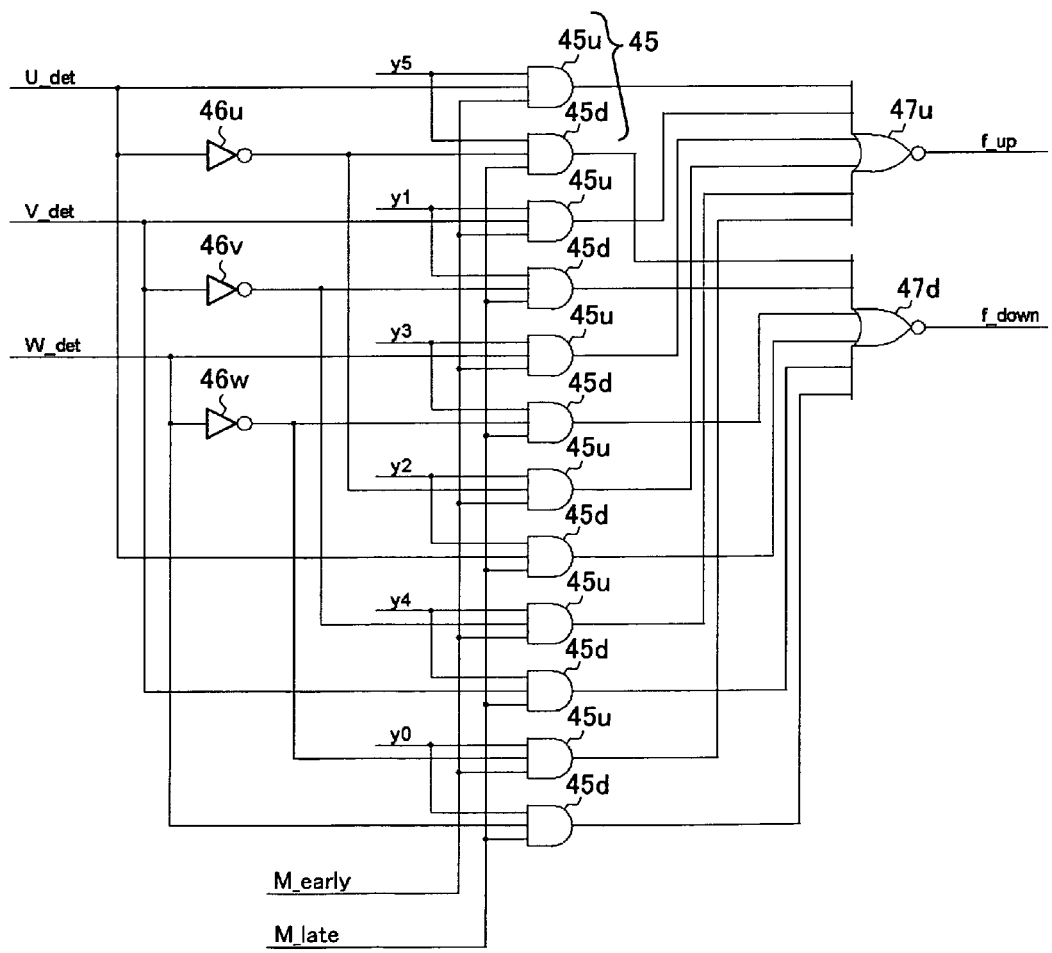

FIG. 5A and FIG. 5B show the circuit blocks and concrete circuits of this desirable aspect.

In the circuit shown in FIG. 5B, as shown in FIG. 5A, the selector 44 and the phase comparator 42 are configured as one circuit block.

This circuit has six AND gate pairs 45 each configured by three-input AND gates 45u and 45d, three inverters 46u, 46v, and 46w, and two six-input NOR gates 47u and 47d.

The first inputs of the six existing AND gates 45u in total receive the six pulse signals y0 to y5 from the drive pulse generator 41 as individual inputs.

The second inputs of the AND gates 45u receive either of the comparator output signals U_det, V_det, and W_det. In more detail, the comparator output signal U_det is input to the second input of the AND gate 45u to whose first input the signal y2 or y5 is input. In the same way, the comparator output signal V_det is input to the second input of the AND gate 45u to whose first input the signal y1 or y4 is input, and the comparator output signal W_det is input to the second input of the AND gate 45u to whose first input the signal y0 or y3 is input.

The limit signal M_early generated at the limit signal generator 43 is input to the third input of the AND gate 45u.

On the other hand, the first inputs of the remaining six AND gates 45d receive as inputs either of the pulse signals the same as those of the adjacent AND gates 45u in the same pairs (either of y0 to y5).

The second inputs of the AND gates 45u receive either of the inverted signals by the inverters 46u to 46w of the comparator output signals U_det, V_det, and W_det. In more detail, the inverted signal of the comparator output signal U_det is input to the second input of the AND gate 45d to whose first input the signal y2 or y5 is input. In the same way, the inverted signal of the comparator output signal V_det is input to the second input of the AND gate 45d to whose first input the signal y1 or y4 is input, and the inverted signal of the comparator output signal W_det is input to the second input of the AND gate 45d to whose first input the signal y0 or y3 is input.

The limit signal M_late generated at the limit signal generator 43 is input to the third input of the AND gate 45d.

The pulse signals y0 to y5 shown in FIG. 2C sequentially become ON (become the high level state). This is repeated. Accordingly, one of the pulse signals y0 to y5 becomes ON at any one time. In FIG. 4B, only the AND gate pair 45 to which this turned on pulse signal y0, y1, y2, y3, y4, or y5 is input can output the high level.

In FIG. 5B, in this AND gate pair able to output this high level, the AND gate 45u can output the high level only when the EMF polarity is "+", and the AND gate 45d can output the high level only when the EMF polarity is "−". At this time, the AND gates 45u and 45d are further limited in pulse width by the limit signal M_early or M_late.

Accordingly, the NOR gate 47u outputs an inverted signal (low active signal) of the signal limited in pulse width according to need as the up signal f_up at the time when the EMF polarity is "+". Further, the NOR gate 47d outputs an inverted signal (low active signal) of the signal limited in pulse width according to need as the down signal f_down at the time when the EMF polarity is "−".

The externally attached charge pump current setting resistor R_Iref generates a current in accordance with the charge pump current setting resistor R_I ref. This current is supplied to the charge pump current setter 6.

The charge pump current setter 6 generates reference currents I_ref1 and I_ref2 of the charge pump circuit 5 based on the input current.

Figure 6:
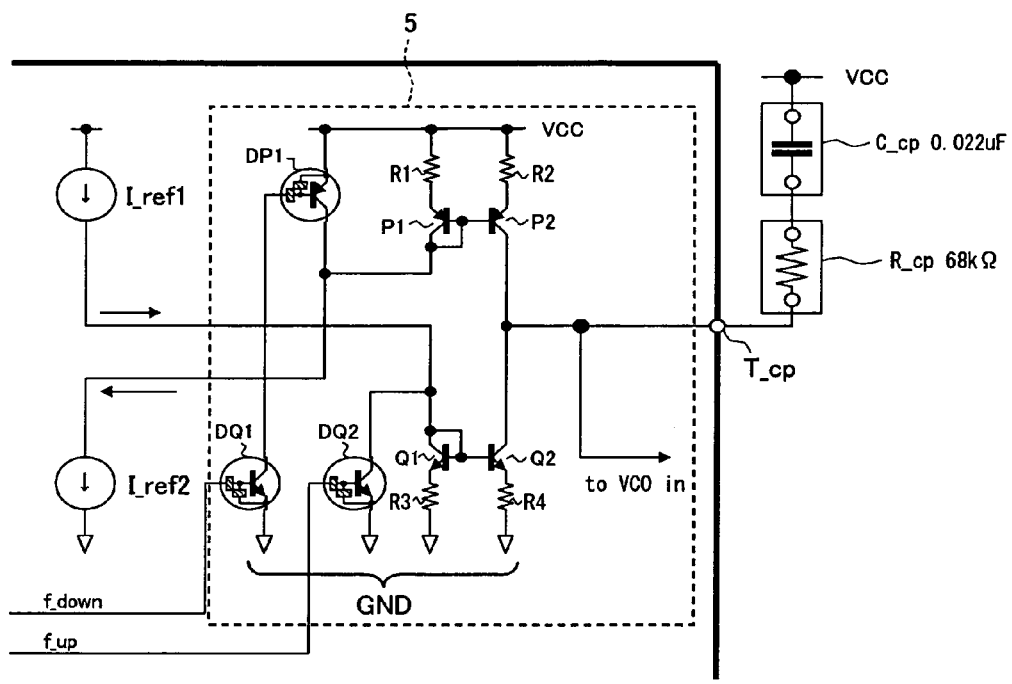
[FIG. 6] A circuit diagram showing an example of the configuration of a charge pump circuit.

FIG. 6 shows an example of the concrete circuit of the charge pump circuit 5.

The phase pump circuit 5 controls charge pump currents I_ref1 and I_ref2 generated in accordance with the charge pump current setting resistor R_Iref by the charge pump current setter 6 according to the up signal f_up output from the NOR gate 47u (FIG. 5B) or the down signal f_down output from the NOR gate 47d (FIG. 5B).

Here, the up signal f_up and the down signal f_down usually have the "H" level and change to the "L" level when they are made active.

Two current sources I_ref1 and I_ref2 shown in FIG. 6 are set by the charge pump current setter 6 using the charge pump current setting resistor R_Iref.

The charge pump circuit 5 shown in FIG. 6 is configured by so-called digital transistors DP1, DQ1, and DQ2 equipped with resistors, usual transistors P1, P2, Q1, and Q2, and resistors R1, R2, R3, and R4. The transistors DP1, P1, and P2 are configured by PNP bipolar transistors, while the transistors DQ1, DQ2, Q1, and Q2 are configured by NPN bipolar transistors.

When the up signal f_up and the down signal f_down are at the H level, the so-called digital transistors DQ1, DQ2, and DP1 equipped with resistors all become the ON state, therefore current does not flow in the transistors P1, P2, Q1, and Q2. When the input impedance of the VCO 7 is set at a sufficiently high value, the potential of the control terminal T_cp maintains a constant value at this time.

When the up signal f_up changes to the L level and is made active, the digital transistor DQ2 becomes the OFF state and the transistors Q1 and Q2 become the ON state.

At this time, current equivalent to the current source I_ref1 flows from the charge pump resistor R_cp to the ground voltage GND through the control terminal T_cp and the transistor Q2.

When the down signal f_down changes to the L level and is made active, the digital transistors DQ1 and DP1 become the OFF state and the transistors P1 and P2 become the ON state. At this time, current equivalent to the current source I_ref2 flows from the control terminal T_cp to the direction of the charge pump resistor R_cp.

In this way, when the input up signal f_up is made active, the charge pump circuit 5 sends the charge pump current from the charge pump capacitor C_cp and the charge pump resistor R_cp connected to the control terminal T_cp of the motor drive IC 2 in the direction of the motor drive IC 2. In this current direction, the potential of the control terminal T_cp falls, therefore the VCO 7 operates in the direction raising the oscillation frequency.

On the other hand, when the input down signal f_down is made active, the charge pump circuit 5 sends the charge pump current from the motor drive IC 2 in the direction of the charge pump capacitor C_cp and the charge pump resistor R_cp connected to the control terminal T_cp thereof. In this direction, the potential of the control terminal T_cp rises, therefore the VCO 7 operates in the direction lowering the oscillation frequency.

One control time when raising the oscillation frequency of the VCO 7 or one control time when lowering the same are the time up to the switch of the direction of the charge pump current to reverse that hitherto. This is defined by the period during which the up signal f_up or the down signal f_down is made active, i.e., here, the pulse width of the L level. The larger the width, the larger the rise of the oscillation frequency of VCO 7 or the larger the fall and the larger the control amount.

Accordingly, when viewing this over a short period, the potential of the control terminal T_cp fluctuates and dynamically changes along with the time, but the mean potential when viewing this for a relatively long period relatively becomes high when the frequency is raised and while relatively becomes low when the frequency is lowered.

Conventionally, this VCO control potential was changed to DC by the smoothing filter, therefore a very large capacitance and resistance were required. Further, the response became late.

Contrary to this, in the present embodiment to which the present invention is applied, the VCO control voltage is directly raised and lowered without going through a smoothing filter. In more detail, when the up signal f_up or down signal f_down is made active, the direction of the current of the charge pump circuit 5 is instantaneously switched, and the VCO control voltage instantaneously rises or falls corresponding to this, therefore the response is very fast.

Here, the charge pump capacitor C_cp in the present example becomes an integration element by the constant of the charge pump operation. Further, the charge pump resistor R_cp becomes an instantaneous element by the constant of the charge pump operation, that is, plays the role of a conversion element changing the current to the voltage value. The value of the charge pump capacitor C_cp is for example 0.22 μF, and the value of the charge pump resistor R_cp is for example 68 kΩ.

FIG. 7A1 to FIG. 7E5 show four examples of the change of voltage of the VCO control terminal (T_cp terminal) in accordance with the pulse widths of the up signal f_up and the down signal f_down. In the present example, the waveforms of the relationship of the EMF polarity inverted phases of phases detected by the rotor phase detector 3 and the voltage of the control terminal T_cp are shown. Further, FIG. 7A1 to FIG. 7E5 show response waveforms of portions by the EMF polarity inversion phase position while dividing these to four examples.

Example 1 is shown in FIG. 7B1 to FIG. 7B5, Example 2 is shown in FIG. 7C1 to FIG. 7C5, Example 3 is shown in FIG. 7C1 to FIG. 7C5, and Example 4 is shown in FIG. 7D1 to FIG. 7D5.

Here, the limit signals M_early and M_late used in the present example are shown in FIG. 7A3 and FIG. 7A4. Further, for comparison, the oscillation clock signal CLK_vco, the fourth frequency divided signal QD and electric angle scale, and the phase output drive information (pulse signal y5) are shown in FIG. 7A1, FIG. 7A2, and FIG. 7A5.

In the present example, the pulse width T_early of the limit signal M_early was set in a range from −15 [deg] to 0 [deg] corresponding to the drive electric angle. Further, the pulse width T_late of the limit signal M_late was set in a range from 0 [deg] to 26.25 [deg] in the same way. Repeating this, one of major characteristic features of the present embodiment is that the T_late side pulse width is set broader than the T_early side pulse width.

For explanation, the phase output drive information (FIG. 2F) was fixed at the position of "y5", but an equivalent operation is carried out at the "y0" to "y5" of drive states of all phase outputs. Accordingly, the target phase range becomes −30 [deg] to +30 [deg] in drive electric angle as shown in FIG. 7A2.

Example 1 shows the time when the EMF polarity inversion position by the rotor phase, that is, the rising phase of the U_det signal, is considerably earlier than the zero degree phase of the drive electric angle (FIG. 7B1).

At this time, the up signal f_up (FIG. 7B2) is limited in phase by the pulse width T_early of the limit signal M_early so that the active time of the L level is limited. Further, the down signal f_down at this time holds the H level (FIG. 7B3). Further, the charge pump current (FIG. 7B4) flows from the charge pump resistor R_cp toward the control terminal T_cp by exactly the amount of the pulse width T_early of the limit signal M_early. The L level shown in the voltage of the control terminal T_cp (FIG. 7B5) becomes a potential drop of the amount of a δVCP instantaneous correction for the period for which the charge pump current (FIG. 7B4) flows. This value is a product of the charge pump current (FIG. 7B4) and the charge pump resistor R_cp. After the end of the flow of the charge pump current (FIG. 7B4), the voltage of the control terminal T_cp becomes a potential drop of the amount of the δVCP integration correction. This value of the δVCP integration correction becomes a value obtained by dividing the product of the charge pump current value (FIG. 7B4) and the active time of the up signal f_up (amount of charge fluctuation of the charge pump capacitor C_cp) by the capacitance value of the charge pump capacitor C_cp.

As a result of the above, the VCO 7 becomes high in the frequency output due to the change of the voltage of the control terminal T_cp.

Example 2 indicates the time when the EMF polarity inversion position by the rotor phase, that is, the rising phase of the U_det signal, is delayed by exactly 20° in the drive electric angle from the rising phase of the U_det signal in Example 1 (FIG. 7A2). At this time, this is not limited by the mask signal M_early, therefore the up signal f_up is made active at the rising of the U_det signal.

In Example 2, the period during which the charge pump current flows becomes shorter than that in Example 1 (FIG. 7C4), therefore a potential drop of the amount of the δVCP integration correction of the voltage of the control terminal T_cp becomes smaller than that in Example 1 (FIG. 7C5).

Example 3 indicates a case where the EMF polarity inversion position by the rotor phase, that is, the rising phase of the U_det signal, coincides with the zero phase position of the drive electric angle.

At this time, neither of the up signal f_up nor the down signal f_down is made active (FIG. 7D2 and FIG. 7D3), therefore the voltage of the control terminal T_cp maintains a constant value (FIG. 7D5).

Example 4 indicates the time when the EMF polarity inversion position by the rotor phase, that is, the rising phase of the U_det signal, is later by 30° than the zero degree phase of the drive electric angle.

At this time, the down signal f_down (FIG. 7E3) is limited in phase by the pulse width T_late of the limit signal M_late signal to limit the active time of L level. Further, the up signal f_up at this time maintains the H level (FIG. 7E2). The direction in which the charge pump current is output becomes the direction toward the charge pump resistor R_cp side from the control terminal T_cp reverse to Example 1 and Example 2 hitherto. In the present example, the voltage of the control terminal T_cp rises (FIG. 7E5), therefore the frequency output by the VCO 7 becomes low.

Note that by the configuration of VCO 7 explained before, when the VCO 7 is operating at a low frequency such as at the time of startup, since the lower limit frequency is provided in the VCO 7, this does not become a frequency lower than this.

Figure 8:
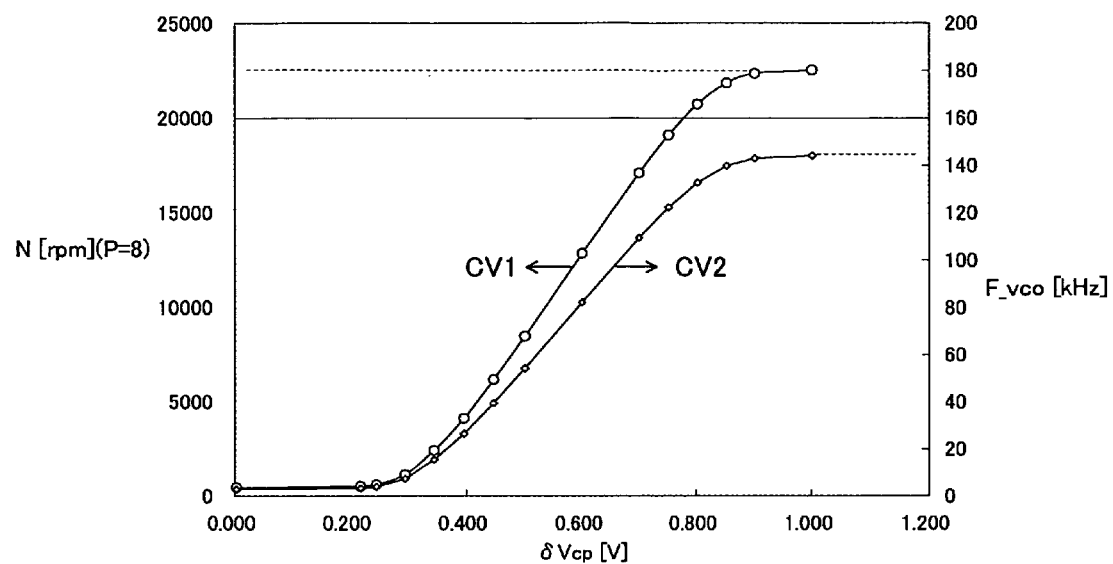
[FIG. 8] A graph showing an example of input/output characteristics of a VCO.

FIG. 8 shows an example of the input/output characteristics of the VCO 7.

In the frequency division ratio of the drive pulse generator 41, when the number P of rotor magnetized poles is eight, the relationship between the rotation speed N of the motor and the output frequency F_vco of the VCO 7 becomes as in the following equation.

$$N[\text{rpm}] = F\_vco[\text{Hz}]/6.4 \qquad (2)[\text{Equation 2}]$$

A curve CV1 shown in FIG. 8 indicates the motor rotation speed N, and a curve CV2 indicates the oscillation frequency F_vco of the VCO 7. Further, on the abscissa of FIG. 8, the potential difference of the drop of the voltage of the control terminal T_cp from the Vcc voltage is defined as $\delta Vcp[V]$.

It is seen that even when $\delta Vcp$ is 0[V], that is, the voltage of the control terminal T_cp is at the same level as the Vcc voltage, the VCO 7 does not suspend the oscillation, but continues the oscillation at about 2.56 [kHz]. This lower limit oscillation frequency is about 400 rpm converted by motor rotation speed N.

The motor was driven by using the motor drive circuit 1 of the present embodiment.

The motor 100 used at this time is a three-phase brushless motor, in which the number P of rotor magnetized poles is eight, the standard voltage is 3V, the startup current is 0.1 A, a rotor inertia is $3 \times 10^{-8}$ [kg·m$^2$], and a torque constant is $2 \times 10^{-3}$ [N·m/A].

The charge pump current is 1.5 µA, the charge pump capacitor C_cp is 0.022 µF, and the charge pump resistor R_cp is 68 kΩ. The voltage generated when the charge pump current flows in the charge pump resistor R_cp becomes 102 mV. By the VCO 7, this voltage is converted to a rotation speed displacement of about 3984 rpm.

When the motor startup frequency is set at 420 rpm, the VCO gain is about 250 kHz/V (about 39062.5 rpm/V converted to a rotation speed gain). The maximum oscillation frequency of the VCO is about 22.500 rpm in conversion to the rotation speed.

The standard rotation speed of the motor at the standard voltage 3V is about 12000 rpm, therefore the performance of the VCO is sufficient.

FIG. 9 to FIG. 13 show actual operation waveforms.

Figure 9:
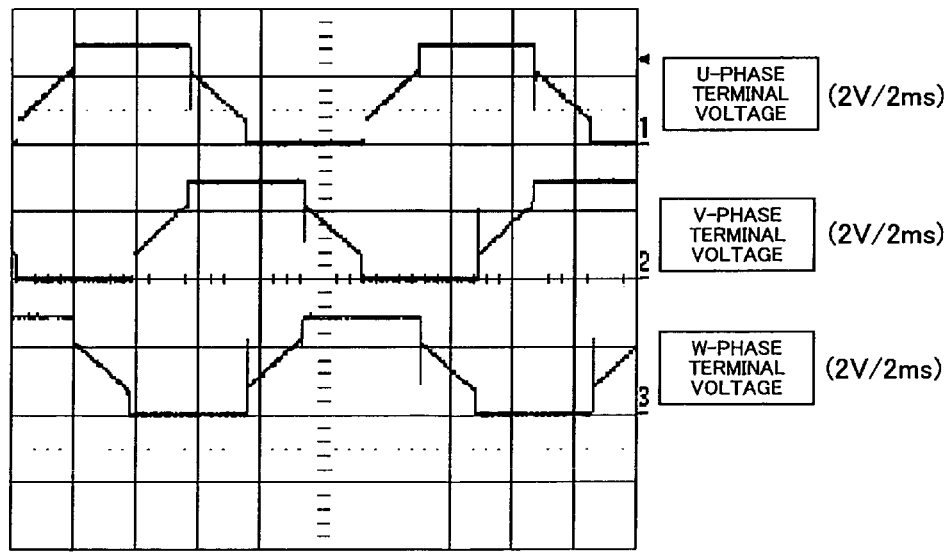
[FIG. 9] A diagram showing a first example of an actual operation waveform.

FIG. 9 shows operation waveforms in the normal state.

The waveforms are, from the top, the U-phase drive signal U (U-phase terminal voltage), the V-phase drive signal V (V-phase terminal voltage), and the W-phase drive signal W (W-phase terminal voltage). For the names of waveforms, the scales of the ordinate and the abscissa are shown. For example, for the U-phase terminal voltage, one gradation of the ordinate is 2V, and one gradation of the abscissa is 2 ms, so this is described as (2V/2 ms). This method of description is the same also in the other waveforms of FIG. 9 and FIG. 10 to FIG. 13. The power supplying rule is a 120° power supply type and full wave drive type. This is equal to the contents of the explanation of operations hitherto.

At the time of the no power supply period during which phase voltages of U, V, and W are neither the H level outputs nor L level outputs, the EMF waveform can be seen. For all phases, it is confirmed that the motor is running in a state where all phases are EMF phases, that is, the rotor phase is equal to the drive phase.

Figure 10:
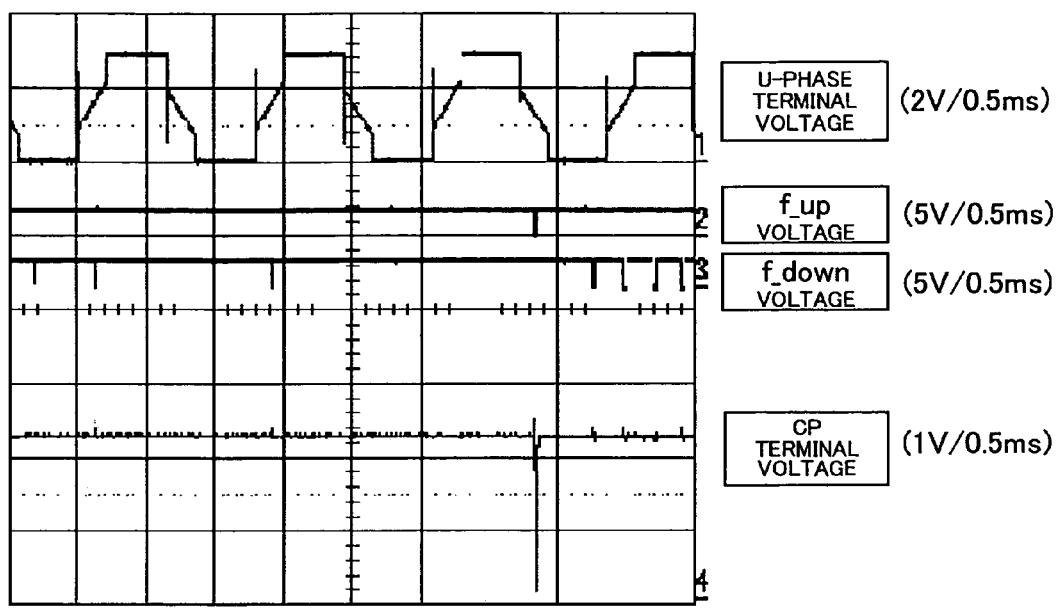
[FIG. 10] A diagram showing a second example of an actual operation waveform.

Also, FIG. 10 shows operation waveforms in the normal state. The waveforms are, from the top, the U-phase terminal voltage, the voltage of the up signal f_up (f_up voltage), the voltage of the down signal f_down (f_down voltage), and the voltage of the control terminal T_cp (CP terminal voltage).

Due to the steady state, the rotor phase and the drive circuit phase coincide, the period during which both of the voltage of the up signal f_up and the voltage of the down signal f_down become the active state is small, and only a small AC signal component is seen in the voltage of the control terminal T_cp.

Figure 11:
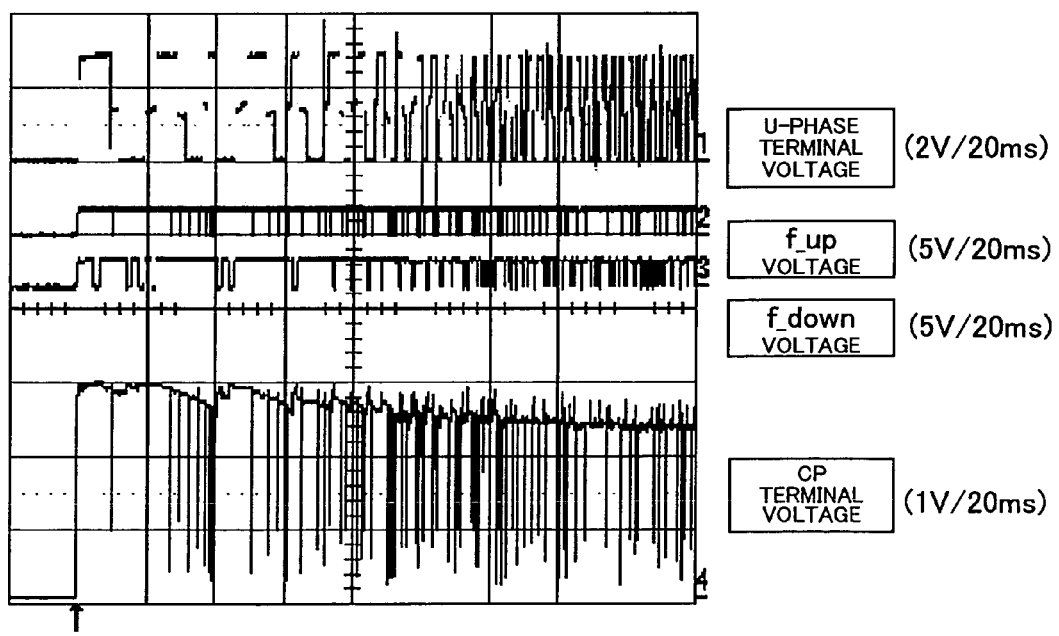
[FIG. 11] A diagram showing a third example of an actual operation waveform.

FIG. 11 shows operation waveforms of an acceleration state from the startup by the turning on of the power supply.

The waveforms are, from the top, the U-phase terminal voltage, the f_up voltage, the f_down voltage, and the CP terminal voltage.

Figure 12:
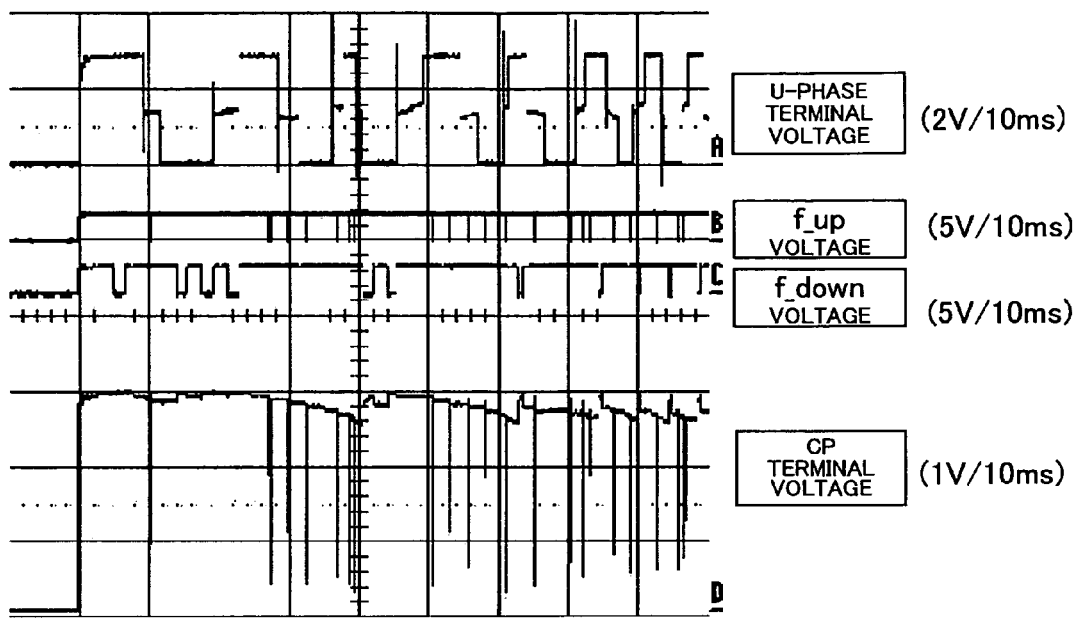
[FIG. 12] A diagram showing a fourth example of an actual operation waveform.
Figure 13:
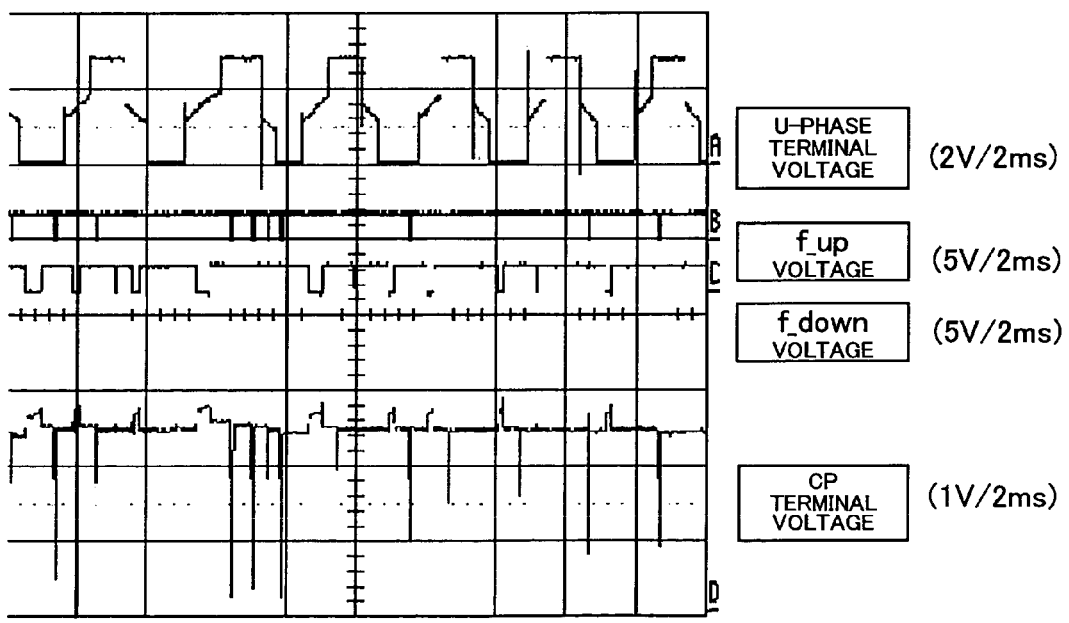
[FIG. 13] A diagram showing a fifth example of an actual operation waveform.

The operation waveforms at the time of the startup and the time of the acceleration are enlarged time-wise from this diagram in FIG. 12 and FIG. 13.

FIG. 12 shows the operation waveforms immediately after startup by turning on the power supply enlarged time-wise among the operation waveforms shown in FIG. 11. The waveforms are, from the top, the U-phase terminal voltage, the f_up voltage, the f_down voltage, and the CP terminal voltage.

Immediately after the startup, the voltage of the control terminal T_cp (CP terminal voltage) is equal to the Vcc voltage, therefore the VCO 7 outputs the oscillation frequency set as the lower limit, and the motor starts the startup by this startup rotation speed. When the motor starts the startup, an EMF is generated by the rotation operation of the rotor. The EMF waveform is seen at the time of no supply of U-phase electric power. The rotor phase is detected from the EMF phase, the charge pump current changes according to the up signal f_up and the down signal f_down obtained as a result of comparison of the drive circuit phases, and the voltage of the control terminal T_cp is changed.

In the phase judgment immediately after the startup, even when the rotor phase is later than the drive circuit phase and the down signal f_down is activated to the L level, the VCO 7 does not output a frequency lower than the startup rotation speed. For this reason, the motor does not stop during the startup.

Note that, in the present example, the rotor phase at the time of the startup is unstable.

In the example of the waveforms of FIG. 12, for a period of about 40 ms immediately after the startup, the rotor of the motor turns at the startup rotation speed as it is without acceleration until a rotor phase suitable for acceleration. The motor starts accelerating from the period after about 40 ms from the time immediately after the startup.

When the up signal f_up is made active at the time when the motor startup rotation speed is about 420 rpm, the charge pump current flows in the charge pump resistor R_cp mentioned before and the rotation speed changes by about 3984 rpm. Note that the rotation of the rotor is limited by the acceleration ability due to the drive torque of the motor and the inertia of the rotor, therefore this does not synchronously track the change of the rotation speed of the drive circuit.

A deviation dn of the motor rotation speed is represented by the following equation (3).

$$dN = 60 \cdot \tau/(J \cdot 2\pi)dt \qquad (3)[\text{Equation 3}]$$

Here, $\tau$ is the motor drive torque, J is the rotor inertia, and dt is the deviation period.

When the number of rotor poles is eight when the startup rotation speed is about 420 rpm, the deviation corresponding to 360° of the electric angle becomes about 35.7 ms. The period during which the up signal f_up is made active corresponds to the electric angle 15° at the maximum, therefore this period is about 1.5 ms.

From the startup current of 0.1 A, the rotor inertia of $3 \times 10^{-8}$ [kg·m²], and the torque constant of $2 \times 10^{-3}$ [N·m/A], the motor drive torque $\tau$ becomes $2 \times 10^{-4}$ [N·m], and the displacement dN of the motor rotation speed becomes 95.5 [rpm]. This is only about 1/42 of the about 3984 rpm of the value of the rotation speed displacement of the circuit.

That is, when the motor rotates in a low rotation speed range such as the startup rotation speed, the up signal f_up becoming active acts to shift the operation phase of the phase output drive more smoothly and advance it to a drive phase suitable for acceleration by instantaneously raising the drive circuit frequency rather than contributing to the acceleration operation of the rotor.

FIG. 13 shows operation waveforms during the motor acceleration among the operation waveforms shown in FIG. 11. The waveforms are, from the top, the U-phase terminal voltage, the f_up voltage, the f_down voltage, and the CP terminal voltage.

From FIG. 13, a situation of acceleration while the phase of EMF and the drive circuit phase match is seen.

In the present embodiment, the maximum oscillation frequency of the VCO 7 must, when converted to the rotation speed, exceed the highest rotation speed of the motor. This is because in the control of the present embodiment, by combining three open loops with each other, the entire system forms one closed loop. The operation point thereof is determined according to the voltage of the control terminal T_cp. The VCO oscillation frequency, that is, the rotor rotation speed, is defined by that.

In order to stabilize the operation point, the loop gain must exist in the vicinity of the operation point. That is, up to the frequency range exceeding the operation point comprised of the rated rotation speed of the motor, the VCO gain must not be zero.

Below, the components of the three open loops will be explained.

The first is the motor 100. By the drive of the coils 102U, 102V, and 102W of the U-, V-, and W-phases, the motor 101 rotates and generates the EMF at the time of no supply of electric power to the phases.

The second is the control system circuit for judging the phase difference from the rotor phase detector 3 to the charge pump circuit 5 in the motor drive circuit 1 and generating the up signal f_up and the down signal f_down. This control system circuit obtains circuit phase information from the drive pulse generator 41 in order to judge the drive circuit phase, but a feedback loop by these signals is not formed in the control system circuit.

The third is the drive system circuit from the VCO 7 to the output unit 9 in the motor drive circuit 1.

In the present embodiment, by combining the components of these independent three open loops like an eddy, one closed loop is formed.

There are large advantages to the components being open. Namely, one of the advantages is that there is no risk of abnormal oscillation etc. and the circuit design and circuit inspection are easy. Further, there is the advantage that the operation parameters such as the T_early phase width and the charge pump current can be set optimally for only the object of the operation since there is no tradeoff etc. of circuit stabilization.

By the motor according to the present embodiment and its drive circuit, the following effects are exhibited.

First, a sensorless motor drive circuit reliable in startup and enabling stable rotation operation of the motor can be provided. At this time, the voltage of the control terminal T_cp of the VCO 7 is directly and instantaneously driven in accordance with the information of phase delay and phase advance at each time, therefore the response is quick.

Second, this is a simple circuit suitable for formation as an IC, therefore the IC circuit scale can be minimized.

Third, the drive circuit does not have a feedback loop inside it, therefore is a stable circuit. As a result, the circuit design and circuit inspection are easy.

Fourth, the number of the externally attached electric parts other than the drive IC is small.

In the example of FIG. 1, other than the motor drive IC 2, there were four externally attached electric parts including the decoupling capacitor C_DC for the power supply. Of these, the two resistors can be incorporated into the motor drive IC 2, therefore the number of externally attached electric parts can be decreased to two.

Further, the constants of the externally attached electric parts are independent values not depending upon the operation of the drive circuit. They need only correspond to the magnetic characteristics and mechanical time constant of the motor. Therefore, optimization of the constants is easy. In addition, there is a relatively broad permissible range with respect to the constants.

Fifth, the constants of the externally attached electric parts are small and are values obtained at the chip size of the "0603: JIS standard", therefore there is the advantage that the overall size can be made smaller also on this point.

Where using a motor 100 having a power supply voltage V_cc equal to 3V, a startup current of 0.1 A, an inertia of $3 \times 10^{-8}$ [kg·m²], and a torque constant of $2 \times 10^{-3}$ [N·m/A], the constants for obtaining the required operation waveforms may be small, for example, the resistance value of the charge pump resistor R_cp is 68 kΩ and the capacitance value of the charge pump capacitor C_cp is 0.022 μF. Accordingly, there is the advantage that the mounting area occupied by these externally attached parts is extremely small.

Note that the motor drive circuit of the present invention is not limited to driving a three-phase brushless motor. The present invention can also be applied to a brushless motor of multiple phases other than three phases or a single phase. Further, the number of magnetizations of the rotor is not limited to eight poles.

Note that when the drive target is changed, it is necessary to conform with that change and also change the configuration and operation of the motor drive circuit 1. That is, it is necessary to change the number of comparators, the number of phase comparisons, and the configuration of the output circuit in accordance with the number of drive phases and change the configuration for generating the signals driving the output units, for example, the count of the clocks and the phase difference of the output decode signals in accordance with the number of drive phases and the number of magnetizations. Note that even when the number of drive phases and the number of magnetizations are different, the above explanation can be applied intuitively to the basic configuration and operation without regard to these.

Note that the motor system according to the present embodiment has the above motor drive circuit 1 and motor 100.

Although not particularly shown, an eccentric member is attached to the rotor shaft of the motor 100 and the motor 100, the eccentric member, and the motor drive circuit 1 are mounted on the same module board as the vibration motor module. The vibration motor module is built in a mobile phone or other electronic device and is utilized as the notifying means at the time of call reception. Note that the motor system of the present invention is not limited to a mobile phone, but by the application of the present invention, the size can be reduced, the control property is good, and the power consumption can be reduced, therefore the present invention is preferably applied to a mobile type electronic device.

The invention claimed is:

1. A motor drive circuit for driving a sensorless brushless DC motor provided with a rotor and a plurality of coils for rotating the rotor, providing:
    a voltage controlled type variable frequency oscillation circuit operating by a frequency in accordance with a voltage applied to a control terminal and generating a clock signal;
    a drive pulse generator for generating a plurality of drive signals having a cycle defined by the frequency of the clock signal and indicating drive circuit phases having sequentially different phase differences based on the clock signal from the variable frequency oscillation circuit;
    a rotor phase detector for detecting the rotor phase from phases of induction voltages induced in the plurality of coils when supplying said plurality of drive signals to said plurality of coils and rotating said rotor; and
    a phase comparison circuit for
    comparing said detected rotor phase and a drive circuit phase included in the drive signal generated by said drive pulse generator,
    outputting an advance phase difference signal to said voltage controlled type variable frequency oscillation circuit within a range not exceeding a defined advance maximum duration when said rotor phase is advanced from said drive circuit phase, and
    outputting a delay phase difference signal to said voltage controlled type variable frequency oscillation circuit within a range not exceeding a defined delay maximum duration when said rotor phase is later than said drive circuit phase, wherein
    said maximum duration is defined longer than the advance maximum duration.

2. A motor drive circuit as set forth in claim 1, wherein the circuit is further provided with a charge pump circuit, the charge pump circuit
    includes resistors and capacitors having predetermined time constants for converting currents flowing in said control terminal to voltages,
    applies voltages in a direction making the oscillation frequency of said voltage controlled type variable frequency oscillation circuit high to said resistors and said capacitors when there is an advance phase difference signal from said phase comparison circuit,
    applies voltages in a direction making the oscillation frequency of said voltage controlled type variable frequency oscillation circuit low to said resistors and said capacitors when there is a delay phase difference signal from said phase comparison circuit, and
    does not apply voltages to said resistors and said capacitors when there is neither a delay phase difference signal nor advance phase difference signal from said phase comparison circuit.

3. A motor drive circuit as set forth in claim 1, wherein said voltage controlled type variable frequency oscillation circuit has an oscillation frequency lower limit limit circuit determining a startup frequency at which said rotor is reliably started up from a stopped state as a lower limit frequency.

4. A motor system having a built-in sensorless brushless DC motor provided with a rotor and a plurality of coils for rotating the rotor and a motor drive circuit for driving the brushless DC motor in a modular form, wherein:
    said motor drive circuit provides
    a voltage controlled type variable frequency oscillation circuit operating by a frequency in accordance with a voltage applied to a control terminal and generating a clock signal;
    a drive pulse generator for generating a plurality of drive signals having a cycle defined by the frequency of the clock signal and indicating drive circuit phases having sequentially different phase differences based on the clock signal from the variable frequency oscillation circuit;
    a rotor phase detector for detecting the rotor phase from phases of induction voltages induced in the plurality of coils when supplying said plurality of drive signals to said plurality of coils and rotating said rotor; and
    a phase comparison circuit for
    comparing said detected rotor phase and a drive circuit phase included in the drive signal generated by said drive pulse generator,
    outputting an advance phase difference signal to said voltage controlled type variable frequency oscillation circuit within a range not exceeding a defined advance maximum duration when said rotor phase is advanced from said drive circuit phase, and
    outputting a delay phase difference signal to said voltage controlled type variable frequency oscillation circuit within a range not exceeding a defined delay maximum duration when said rotor phase is later than said drive circuit phase, wherein
    said maximum duration is defined longer than the advance maximum duration.

5. A motor system as set forth in claim 4, wherein:

the motor drive circuit is further provided with a charge pump circuit, the charge pump circuit includes resistors and capacitors having predetermined time constants for converting currents flowing in said control terminal to voltages, applies voltages in a direction making the oscillation frequency of said voltage controlled type variable frequency oscillation circuit high to said resistors and said capacitors when there is an advance phase difference signal from said phase comparison circuit, applies voltages in a direction making the oscillation frequency of said voltage controlled type variable frequency oscillation circuit low to said resistors and said capacitors when there is a delay phase difference signal from said phase comparison circuit, and does not apply voltages to said resistors and said capacitors when there is neither a delay phase difference signal nor advance phase difference signal from said phase comparison circuit.

6. A motor system as set forth in claim 4, wherein said voltage controlled type variable frequency oscillation circuit has an oscillation frequency lower limit limit circuit determining a startup frequency at Which said rotor is reliably started up from a stopped state as a lower limit frequency.

7. A motor drive method for driving a sensorless brushless DC motor provided with a rotor and coils for driving the rotor, comprising the steps of operating an oscillator by a frequency in accordance with a voltage applied to a control terminal and generating a clock signal having a frequency in accordance with the oscillation frequency of the oscillator, generating a plurality of drive signals having a cycle defined by the frequency of said clock signal and having sequentially different phase differences based on said clock signal, generating a plurality of drive signals having a cycle defined by the frequency of said clock signal and indicating drive circuit phases having sequentially different phase differences based on said clock signal, detecting the rotor phase from phases of induction voltages induced in said plurality of coils when supplying said plurality of drive signals to said plurality of coils and rotating said rotor, comparing said detected rotor phase and the drive circuit phase included in the drive signal generated in said drive pulse generator;

causing oscillation by the frequency of the voltage in accordance with the advance phase difference signal within a range not exceeding the defined advance maximum duration when said rotor phase is advanced from said drive circuit phase and generating the clock signal of the frequency in accordance with the oscillation frequency, and causing oscillation by the frequency of the voltage in accordance with the delay phase difference signal within a range not exceeding the defined delay maximum duration when said rotor phase is later than said drive circuit phase and generating the clock signal of the frequency in accordance with the oscillation frequency, wherein said delay maximum duration is defined longer than the advance maximum continuance time.

8. A motor drive method as set forth in claim 7, further comprising outputting a voltage in a direction by which said variable frequency oscillation frequency becomes high when there is an advance phase difference signal as a result of said phase comparison, and outputting a voltage in a direction by which said variable frequency oscillation frequency becomes low as a result of said phase comparison.

9. A motor drive method as set forth in claim 7, further comprising controlling a lower limit frequency determining the startup frequency for reliably starting up said rotor from the stopped state as the lower limit at the time of the generation of said clock signal.

10. A motor drive method as set forth in claim 8, further comprising outputting a first signal when the information of the phase deviation indicates that the rotor phase is delayed relative to the electric phase and outputting a second signal when the information of the phase deviation indicates that the rotor phase is advanced relative to the electric phase, making a maximum duration of the active state of the first signal shorter than a maximum duration of the active state of the second signal, and changing the voltage of the control terminal for exactly the duration of the active state of the first or second signal.

11. A motor drive method as set forth in claim 8, further comprising, at the time of the generation of the clock signal, controlling the lower limit frequency to make the startup frequency for reliably starting up the rotor from the stopped state the lower limit.

* * * * *